Nov. 13, 1934.    W. MÖLLER ET AL    1,980,926
REMOTE REVOLUTION INDICATING AND RECORDING APPARATUS
Filed April 26, 1933    4 Sheets-Sheet 1

Inventors
Waldemar Moeller and
Hubert Lorenz
By A. D. Adams
Attorney

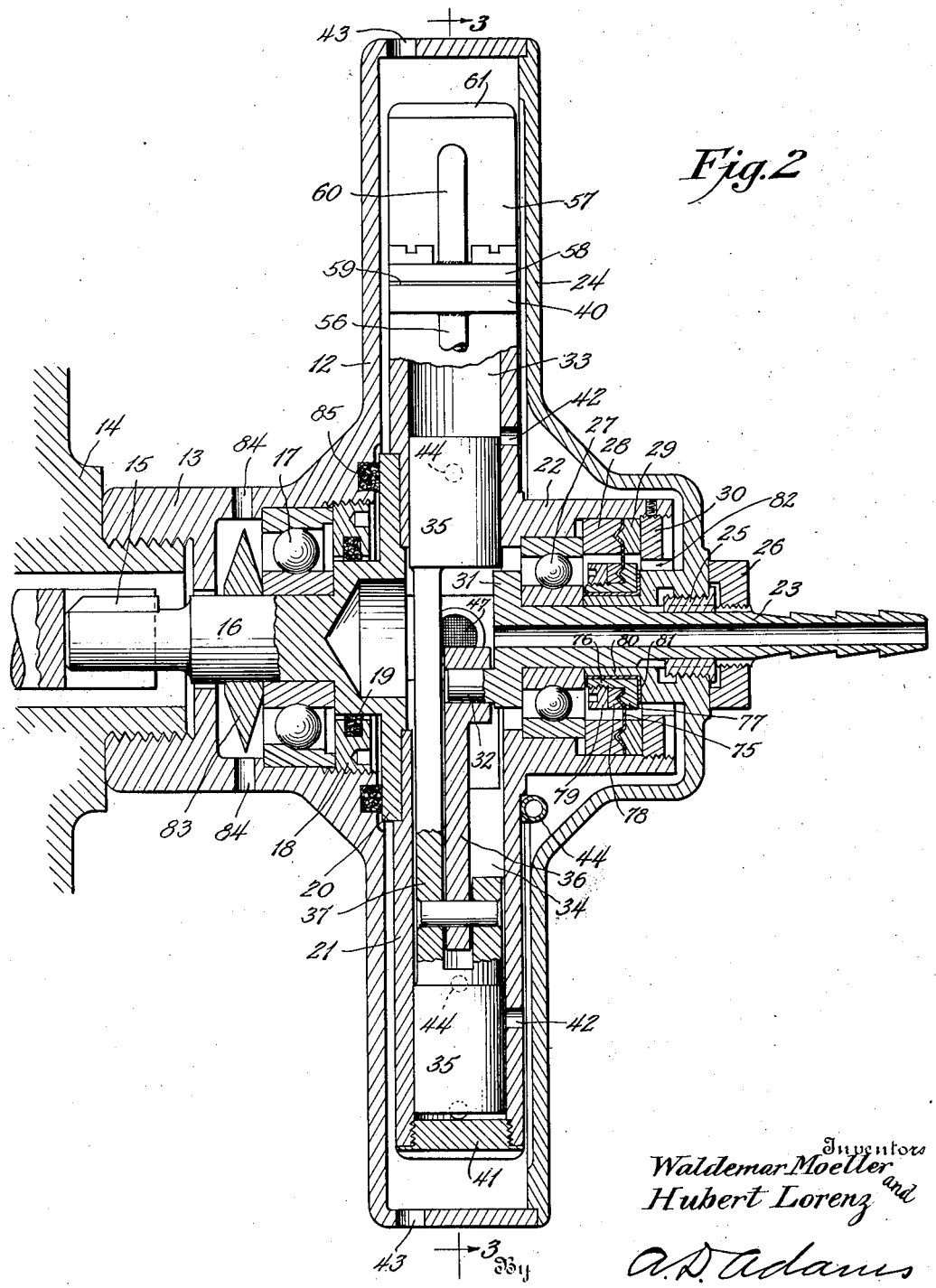

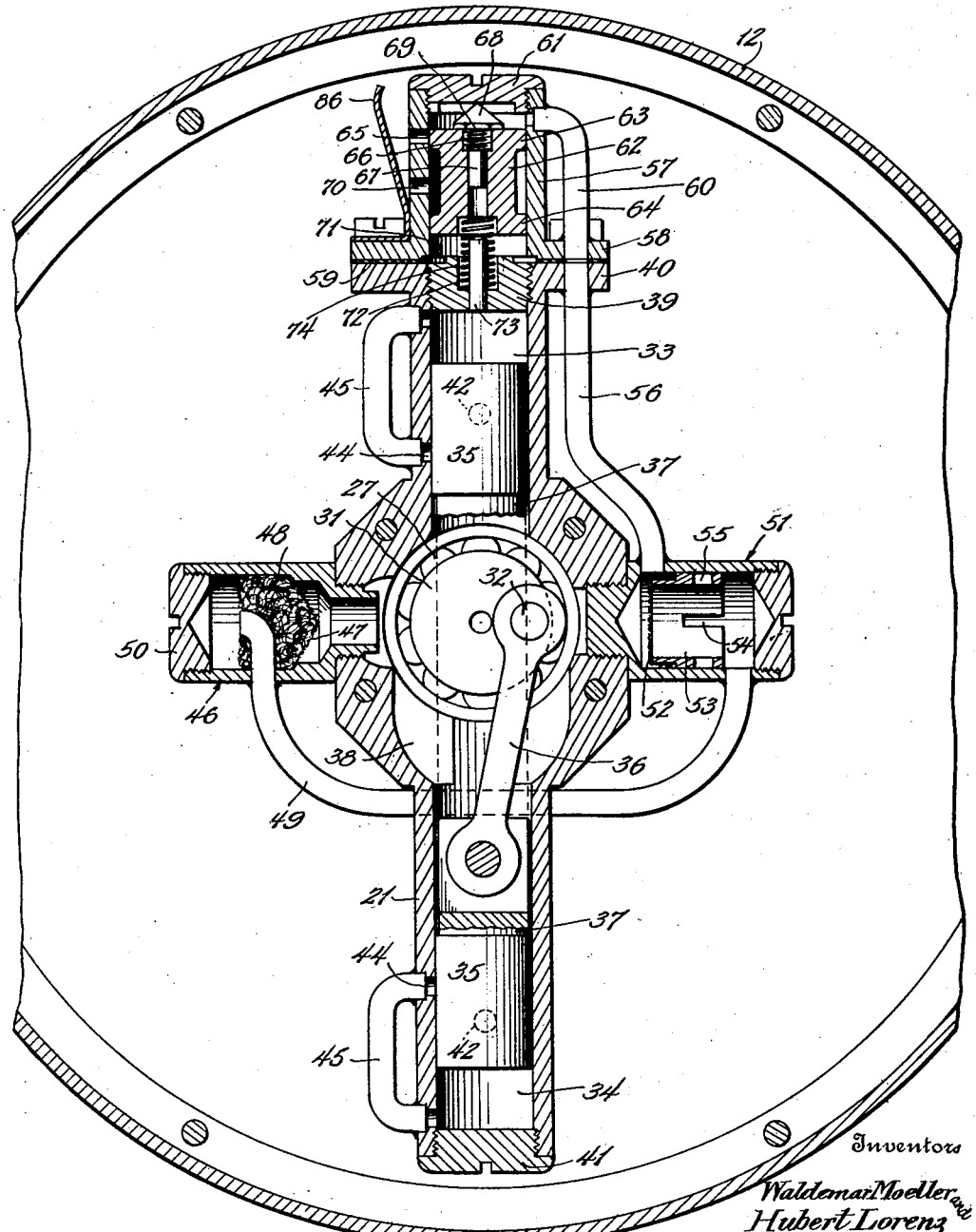

Nov. 13, 1934.  W. MÖLLER ET AL  1,980,926
REMOTE REVOLUTION INDICATING AND RECORDING APPARATUS
Filed April 26, 1933  4 Sheets-Sheet 4

Inventors
Waldemar Moeller and
Hubert Lorenz

By A. D. Adams
Attorney

Patented Nov. 13, 1934

1,980,926

UNITED STATES PATENT OFFICE 1,980,926

REMOTE REVOLUTION INDICATING AND RECORDING APPARATUS

Waldemar Möller, Berlin-Zehlendorf, and Hubert Lorenz, Berlin-Reinickendorf, Germany, assignors to Askania-Werke A. G. vormals Central Werkstatt Dessau und Carl Bamberg-Friedenau, a German company Application April 26, 1933, Serial No. 668,138

12 Claims. (Cl. 264—14)

This invention relates to revolution indicating and recording apparatus and, among other objects, aims to provide greatly improved mechanism for creating and transmitting air pressure which is at all times proportional to the speed of a rotating shaft to remote indicators and recorders. One aim is to produce a dependable and accurate device of the type adapted for use in aeroplanes, dirigibles, motor boats, vehicles and the like, especially when it is necessary or desirable to locate one or more indicators and/or recorders at a distance from the rotating shaft whose speed is to be measured, or to prevent the transmission of vibration to the instrument panel or board. The invention involves a number of important improvements on the devices disclosed in British Patent No. 342,693, of 1931, French Patent No. 682,483, dated May 22, 1930 and French Addition No. 37,538, dated December 20, 1930.

Other aims and advantages of the invention will appear in the specification, when considered in connection with the accompanying drawings, wherein:

Fig. 2 is a central vertical sectional view of a double-acting air pump and associated mechanism adapted to be connected to a shaft;

Fig. 3 is a sectional view taken on the line 3—3 of Fig. 2;

The need for reliable, distant reading revolution indicators and instruments has been felt for many years on account of the advent of large aeroplanes, dirigibles, boats and the like with decentralized engine equipment. Thus far, there has been no satisfactory solution of the problem. This is evidenced by the fact that many large firms are still employing short-distance revolution indicators with mechanically driven shafts or parts to indicate the speed of lateral engines; an arrangement which inevitably will cause trouble, on account of wear, friction and vibration.

A long series of practical experiments and tests have been conducted to determine the practicability of different types of revolution indicators and recorders for use on aircraft and automotive vehicles. We have found that electrical transmitting or operating mechanism is too delicate to stand rough usage and cannot be rendered entirely independent of fluctuations in temperature and moisture. It is further affected by vibrations. Hydraulic transmission is not well suited for the purpose, because it is subject to variations in the static pressure, danger of freezing and temperature changes, aside from the difficulty of making the hydraulic connections absolutely leakproof.

As a result of our experiments, we have developed a greatly improved pneumatic transmitter for distant-reading revolution indicators and recorders which avoids the foregoing drawbacks.

Figure 1:
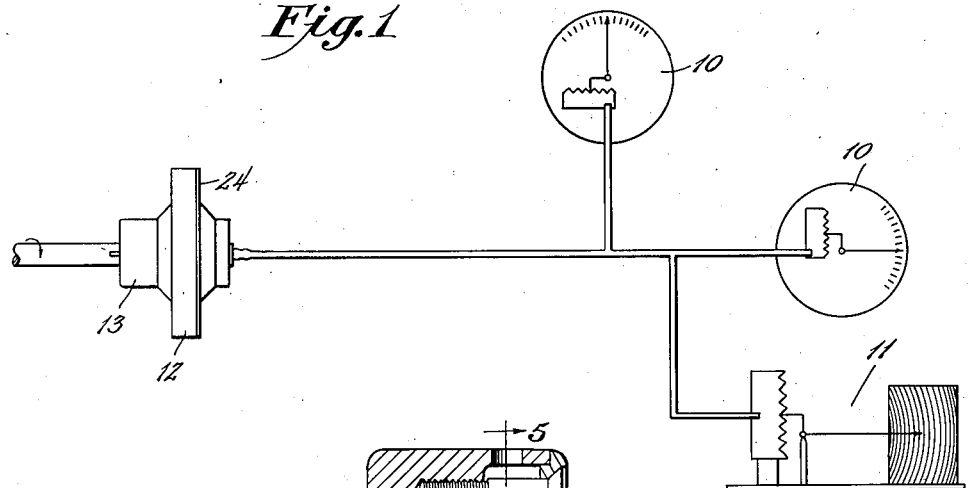
Fig. 1 is a diagrammatic view showing one embodiment of the invention operating a speed indicator and recorder.

Referring particularly to the drawings, we have shown two types of transmitters, one for high speed ranges and the other for low speed ranges. Both types are shown as being particularly designed for attachment to the shafts of aeroplane motors; but it is to be distinctly understood that the apparatus can be applied to shafts of various kinds. We shall assume, for the sake of this explanation, that the disclosed apparatus is intended for aircraft use. We shall further assume that two indicators 10, of conventional design, shown diagrammatically in Fig. 1, are located in separate instrument panels in the aeroplane; while a recorder 11 may be placed in any part of the fuselage, to keep a record of the performance of the engine. When there are several engines in a dirigible or large aeroplane, a series of indicators 10 may be placed side by side in one or more panels and the recorders mounted on any rigid part of the fuselage or frame where they are not affected by extraordinary vibrations. Also, there may be as many sets of indicators as desired for each engine, so that different officers or pilots and assistants may keep informed about the speed of the engines. Moreover, the instruments may be connected in parallel to the transmitter by an ordinary tube, as shown.

Referring particularly to the transmitting apparatus, shown in Figs. 2 and 3, there is shown a cast metal protecting casing 12 having a female threaded hub 13 adapted to be screwed on a motor housing 14 so that the casing is fixed or stationary. Projecting through the hub is a key 15 designed to engage the engine shaft whose speed is to be measured and to drive an air pump located within the casing 12. In this instance, the key is integral with a pump driving shaft 16 extending axially into the casing and having an anti-friction bearing 17 held in place by a threaded ring 18 having an annular packing 19 around the shaft. The inner end of the shaft is shown as having a flange 20 by means of which the shaft is bolted or otherwise secured to a pump housing 21 so as to impart rotation to the housing within the casing. The pump housing has a hollow hub 22 which rotates about a stationary tube 23 also extending axially into and supported by a cover plate 24 of the casing 12. This tube is adapted to be connected to the instruments. A key nut 25 is shown as being screwed into the cover plate 24 and a lock or jamb nut 26 is screwed on the tubular shaft against the cover plate to support the shaft. At the inner end of the tubular shaft is an anti-friction bearing 27 fitted in the hub 22 and confined therein by complemental rings 28—29 and a screw threaded clamping ring 30. The inner face of the bearing bears against a radial flange or shoulder 31 on the tubular shaft within the pump housing.

The flange 31 carries an eccentric or crank pin 32 to operate a double-acting pump within the pump housing. The pump housing is here shown as having a pair of cylinders 33 and 34 formed by a single bore and a double-acting piston 35—35 made of one piece works in both cylinders, being connected to the crank pin 32 by a single connecting rod 36. The pistons have a reduced connecting arm or bar 37 to make room for the connecting rod and to provide more space in the crank case or pressure chamber 38 for air to accumulate. The arrangement is such that, as the pump cylinders rotate about the crank pin, the pistons will reciprocate in them.

The cylinder 33 is shorter than cylinder 34 and is shown as being closed by a screw plug 39. The end of this cylinder has a flange 40 and the cylinder 34 is closed by an ordinary screw plug 41. The construction is such that the pumps work on the conventional two-cycle principle.

Each cylinder has an air intake opening 42 which is uncovered by the respective pistons at the inner ends of their strokes, the air entering the stationary casing through a series of openings 43. Air is compressed in the cylinders on the outward strokes of the pistons and discharges into the crank-case or pressure chamber 38 when the inner ends of the pistons uncover ports 44 which are connected by conduits 45 to the compression chambers of the cylinders. On each revolution of the pump housing, the pressure in the crank-case is increased.

The air pressure in the crank-case 38 is governed by a centrifugal valve so that it is always proportional to the speed of the shaft. In this instance, some of the air passes from the crank-case into a preliminary cylindrical strainer 46 cast integral with or screwed into the crank-case and having a wire screen 47 at its inner end, the chamber being preferably filled with cotton wool 48, to remove oil or grease and dirt from the air which comes from the crank-case. From this strainer the air passes through a tube 49 which extends upwardly through the bottom side of the strainer and is brazed or soldered therein, the mouth of the tube being bent outwardly and lying at about the axis of the strainer to prevent any accumulated oil from entering the tube. To enable the strainer to be cleaned or drained and the cotton wool to be replaced, it is closed by a removable screw cap 50.

The air passes through the tube 49 into a second cylindrical filtering strainer 51 cast integral with or screwed into the opposite side of the crank-case. In this strainer, there is shown a fine mesh screen 52 stretched across the inner open end of a metal sleeve 53 which has slots 54 in its outer end portion to permit it to be slightly expanded so that it will frictionally engage the bore of the strainer. The sleeve also has opposed radial slots 55 to be engaged by a pulling tool and facilitate removal. If desired, several screens may be employed in the second strainer or more strainers used in series to remove all of the remaining oil and dirt from the air. It will be understood that the tube 49 is also brazed or soldered in an opening through the outer end portion of the strainer wall.

The cleansed air passes through the screen 52 into another tube 56 soldered at its inner end into an opening in the inner end portion of the strainer and at its outer end in an opening in the flange 40 on the cylinder 33. A cylindrical centrifugal valve casing 57 preferably made of Monel metal, has a flange 58 secured to the flange 40 and made airtight by a gasket 59. Another tube 60 is soldered at its inner end in an opening in the flange 58 registering with the outer end of tube 56 and at its outer end in an opening leading into the outer end of the valve cylinder 57. The cylinder 57 has a very highly polished inner surface and is closed by a screw cap or head 61. Within the cylinder is a centrifugal piston valve 62 which is likewise highly polished and made of special material, preferably Monel metal, to make possible substantially frictionless and continuous operation without oil. This is very important because the slightest amount of oil will vary the coefficient of friction and seriously affect the accuracy of the indications. This piston valve is shown as being spool-shaped, having annular flanges 63 and 64 at its ends acting as bearing surfaces. When the pump housing rotates the piston valve tends to move outwardly by centrifugal force. However, as the air pressure increases in the crank-case and, consequently, in the outer end of the valve cylinder 57, it tends to overcome the action of the centrifugal force and to move the piston valve 62 inwardly. As the piston valve moves inwardly, it uncovers a port 65 to permit some of the air to escape. The size of this port, its distance from the axis of rotation, and the weight and diameter of the piston are all so designed and coordinated as to determine the specific air pressure which balances the centrifugal force exerted by the piston, thereby modifying the pressure in the crank-case 38 so that it is always proportional to the speed of the shaft. In other words, the air pressure multiplied by the area of the piston will be equal to its centrifugal force and thereby maintain the piston in a state of equilibrium with the port either partially or fully opened, depending upon the speed of rotation.

It is important that the mass of the centrifugal piston valve shall be accurately adjusted so that the transmitters can be used interchangeably and will all produce the same air pressure for a given shaft speed, thereby making it possible to use them with standard, calibrated instruments. Hence, the piston is shown as having an adjustment plug 66 screwed axially into its outer end and presenting a stem 67 adapted to be shortened and the weight reduced by filing or cutting it off. The weight may be increased by changing plugs. This plug is shown as having a conical projection 68 on a screw head 69, the purpose being to employ the tapered head as a limiting stop for the piston valve and thereby prevent it from sticking at the outer end of its stroke. This adjustable weight can be removed and the necessary adjustments made without exposing the highly polished piston surface to injury due to handling.

Now, it is also important that no air pressure in the valve cylinder shall pass around the piston to the inner end of the cylinder and upset the equilibrium of the piston. To prevent this, the annular space between the flanges 63 and 64 of the piston is vented to the atmosphere through a vent opening or port 70 in the cylinder wall. The space 71 at the inner end of the cylinder is filled with air which acts as a cushion or shock absorber for damping the movement of the piston. However, the trapped air can slowly escape by leakage past the inner flange 64 of the piston which it moves inwardly, thus preventing a counteracting pressure from disturbing the balance.

To support and normally maintain the piston at the outer end of its stroke during the starting period, there is shown a compression spring 72 guided on a pin 73 which is pressed into the closure plug 39. This spring is seated at its inner end in a bore 74 in said plug and at its outer end in a counterbore in the inner end of the piston. The spring is sufficiently strong to support the weight of the piston valve when it is at rest in its vertical position and maintains it in its starting position, ready to function immediately.

Now, it will be observed that the mass of the rotating parts is symmetrically distributed about the axis of rotation. The combined length of the cylinder 33 and valve cylinder 57 is the same as the cylinder 34. Also, the two strainers 46 and 51 are disposed on opposite sides of the crank-case and substantially counterbalance each other.

It is exceedingly important that the rotating crank-case 38 shall have an airtight seal around the stationary tubular shaft 23 so that the measuring pressure will not be affected by excessive leakage. For this purpose, the complementary annular rings 28—29 have clamped between them by a tongue and groove a flexible diaphragm 75 fitted on a bushing 76 having a flange 77 at the outer end. The inner edge of the diaphragm is clamped against the flange 77 of the bushing by a screw threaded ring 78 and a plain clamping ring 79. The bushing 76 fits closely on an inwardly projecting, cylindrical sleeve 80 integral with the hub 24 and having an annular stop shoulder 81 for the flange 77. It will be understood that all of the foregoing sealing members rotate with the pump housing about the stationary tubular shaft 23 and cylindrical extension 80 of the stationary casing. Air pressure, acting against the flexible diaphragm will always press the flange 77 on the bushing 76 against the bearing surface on the shoulder 81. A chamber 82, outside of the diaphragm, is adapted to be filled with grease when the parts are assembled to prevent undue friction and wear on the parts. This self-sealing packing has been found to be very reliable and requires no attention after the parts are assembled.

It is of utmost importance that oil which might come from an engine whose shaft speed is to be measured, shall not enter the centrifugal valve cylinder through the shaft connection 14 around the key-shaft 16. As has already been explained, the piston valve 62 must operate absolutely dry to give accurate results. To prevent oil from passing through the bearing 17 for the key-shaft 16, there is shown a disk 83 mounted on the shaft and having a sharp peripheral edge in the bearing chamber. This disk throws oil entering said chamber outwardly through a series of radial openings 84 in the chamber by the action of centrifugal force. Any oil which passes this disk through the bearing and past the retaining ring 18 will be stopped by an annular gasket 85 in the casing contacting with the radial flange 20. Should any oil enter the casing 12, the rotating pump housing 21 will throw it outwardly by centrifugal force so that it can escape through the series of openings 43. However, it is desirable to protect the ports 65 and 70 in the centrifugal valve cylinder to prevent any oil or grit from entering the cylinder. In this instance, a metal shield 86 is secured to the flange 58 and overlies the ports to act as a deflector.

Figure 4:
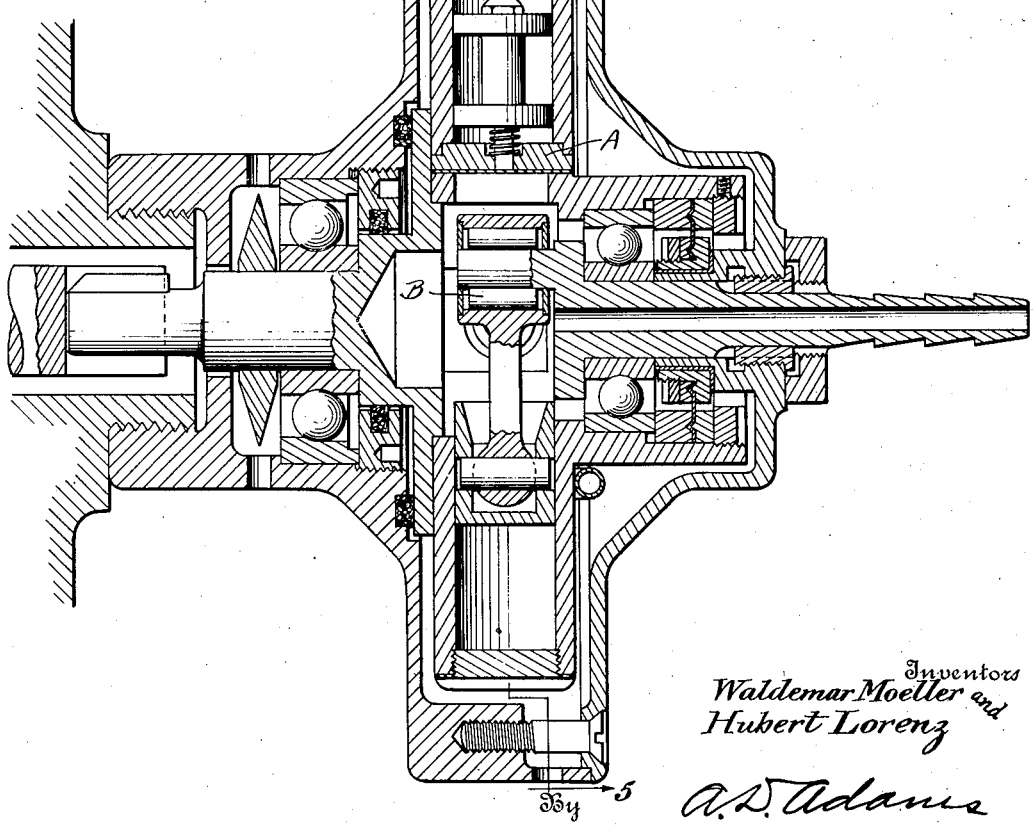
Fig. 4 is a central vertical sectional view through a single-acting pump and associated mechanism adapted to be used for high speed ranges.
Figure 5:
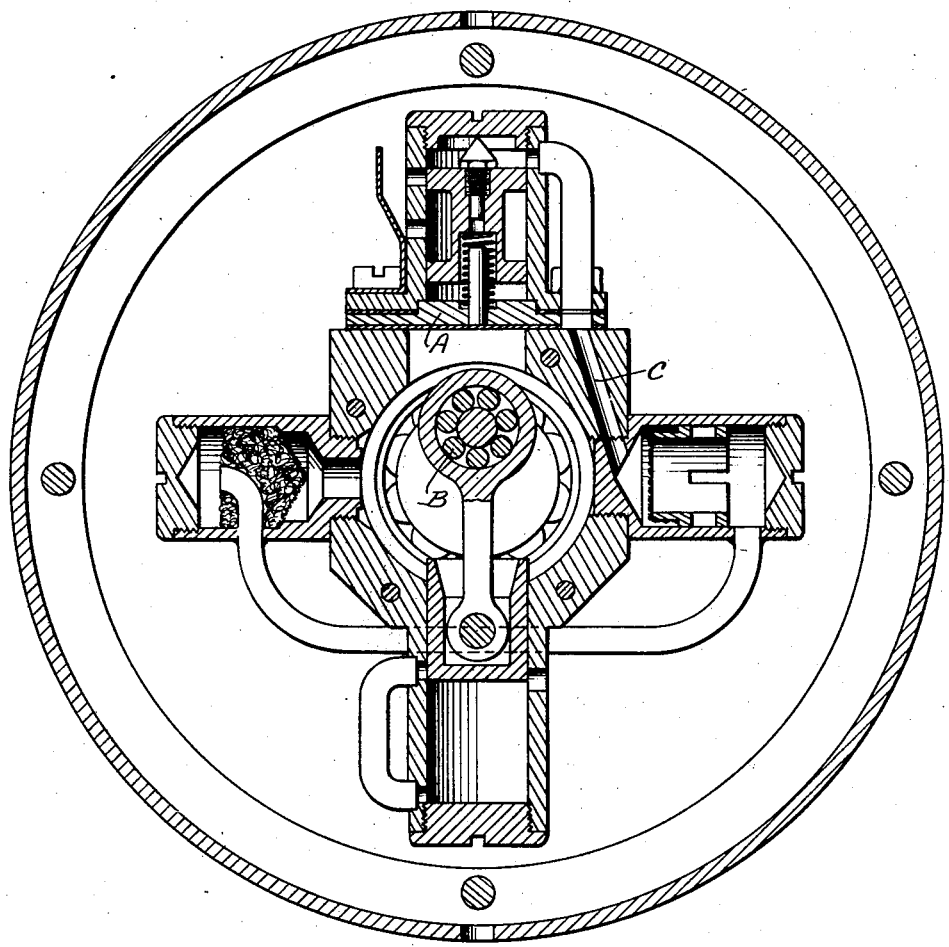
Fig. 5 is a sectional view taken on the line 5—5 of Fig. 4.

The double-acting pump transmitter is especially adapted for relatively low speed ranges. A single-acting pump is preferably employed for high speed ranges because it will supply sufficient air pressure for measuring accurately. In Figs. 4 and 5, a single-acting pump transmitter is shown. It differs from the double-acting transmitter mainly in the elimination of one cylinder and piston. This makes it possible to mount the centrifugal valve cylinder directly on the crank-case of the pump opposite the pump cylinder. In this case, a cover plate A is bolted on the crank-case opening. Also, the connecting rod has an anti-friction crank pin bearing B. The outlet from the second strainer is here shown as being in the form of a bore C through the crank-case.

It is believed that the operation of both types of devices will be understood from the foregoing description. In both cases, air is constantly delivered to the crank-case as the pump housing rotates; a part of the air is discharged from the crank-case through two or more strainers where it is thoroughly cleansed of oil and dirt particles; the cleansed air is permitted to escape through a centrifugally controlled valve associated with the pump housing; the pressure of the air in the crank-case is governed or modified so that it is an accurate measure of the shaft speed; and the air is used to operate one or more calibrated instruments at a distance to indicate and/or record the speed of the shaft. Both designs are relatively simple and easy to attach. The constructions are such that they can be manufactured on a quantity production basis. All machining operations of vital parts are greatly simplified. The centrifugal valve is the only part that requires any careful adjustment to make the transmitters interchangeable for use with standard calibrated measuring instruments. This adjustment can be made at the factory.

Obviously, the present invention is not restricted to the particular embodiment thereof herein shown and described. Moreover, it is not indispensable that all the features be used conjointly, since they may be employed advantageously in various combinations and sub-combinations.

What we claim is:

1. In a pneumatic speedometer, a rotatable pump housing adapted to be connected to a shaft the speed of which is to be measured and having a pair of opposed cylinders one of which is shorter than the other; connected pistons in said cylinders having the same stroke; a centrifugal governing piston valve having its cylinder mounted on the short pump cylinder so as to distribute the masses substantially equally with respect to the center of rotation; and an outlet from the pump adapted to be connected to a measuring instrument.

2. In a pneumatic speedometer of the character described, a stationary casing having integral means to secure it in axial alinement with a shaft the speed of which is to be measured; an air pump having a housing rotatably mounted within the casing; a driving shaft for the air pump adapted to be removably connected to the shaft the speed of which is to be measured; an air outlet conduit communicating with the pump secured to said stationary casing and about which the pump housing rotates; and a centrifugal governing valve communicating with the pump having means to modify the air pressure created by said pump, said valve being removably connected to the pump housing.

3. In a pneumatic speedometer of the character described, a stationary casing having a hub adapted to be secured in axial alinement with a shaft the speed of which is to be measured; an air pump having a rotatable housing axially mounted in the casing; a shaft projecting from one side of the air pump having means for removably connecting it to the shaft the speed of which is to be measured; a centrifugal governing valve having a highly polished cylinder removably secured to the pump housing and a highly polished piston operating therein free of oil; a conduit connecting the pump to said cylinder; and an outlet conduit secured to said casing and providing a bearing at one end about which the pump housing rotates.

4. In a pneumatic speedometer of the character described, a stationary casing having means to secure it coaxially with a shaft the speed of which is to be measured; a rotatable air pump having a housing axially mounted within the casing; a shaft on the pump housing adapted to be removably connected to the shaft the speed of which is to be measured; a stationary outlet tube axially connected to the housing and providing one bearing about which the pump housing rotates; a self-sealing packing between the stationary casing and said housing arranged to be kept airtight by the air pressure; and a centrifugal valve communicating with and secured to said pump having means to govern the pressure created by the pump.

5. In a pneumatic speedometer of the character described, a stationary casing having a hub adapted to be connected coaxially with a shaft the speed of which is to be measured; an air pump having a housing rotatably mounted in the casing; a key shaft adapted to connect the pump housing to the shaft the speed of which is to be measured; a centrifugal governing valve removably secured to the pump housing and having highly polished portions arranged to operate without oil, said valve having a discharge port leading to said casing; and packing members between the housing and the casing to prevent oil from entering the casing about said key shaft, said casing having a plurality of radial openings in its periphery through which foreign matter thrown out by the pump may escape.

6. In a pneumatic speedometer of the character described, a stationary protecting casing; an air pump having a housing rotatably mounted in the casing; a centrifugal piston valve removably secured to the pump housing and having dry polished surfaces working without oil to modify the air pressure created by the pump; and a conduit connecting the pump to the valve having a plurality of strainers for cleansing the air before it enters the valve.

7. In a pneumatic speedometer of the character described, a rotatable air pump having a reciprocating piston; means to connect the pump housing to a shaft the speed of which is to be measured; a centrifugal piston valve having a cylinder removably secured to the pump housing and presenting dry polished surfaces to work without oil; a conduit connecting the pump to the valve; and a cylindrical strainer on the pump housing connected to the conduit to cleanse the air before it enters the valve cylinder.

8. In a pneumatic speedometer of the character described, a casing having means to connect it coaxially with a shaft the speed of which is to be measured; an air pump having a rotatable housing coaxially mounted within the casing and adapted to be connected to the shaft the speed of which is to be measured; a centrifugal piston valve secured to the pump housing and having dry polished surfaces working in its cylinder; a conduit connecting the pump to the valve cylinder; a pair of strainers on the pump housing mounted substantially radially with respect to its axis of rotation and connected to the conduit to cleanse the air passing therethrough; and an outlet conduit connected to the pump and coaxially secured to said casing.

9. In a pneumatic speedometer of the character described, a stationary casing having integral means to secure it in axial alinement with a shaft the speed of which is to be measured; a pump housing rotatably mounted within the casing and having a single cylinder; a stub shaft on the pump housing having means to connect it to the shaft the speed of which is to be measured; a centrifugal governing valve having a cylinder secured to the pump housing opposite the pump cylinder; a conduit connecting the pump to the centrifugal governing valve; and an outlet tube from the pump forming a bearing for the pump housing.

10. In a pneumatic speedometer of the character described, a stationary casing; a rotatable pump housing mounted in the casing and adapted to be connected to a shaft the speed of which is to be measured; a pair of opposed cylinders in the pump housing one of which is shorter than the other; connected pistons in said cylinders having the same stroke; a centrifugal governing piston valve having a cylinder secured to the outer end of the short pump cylinder whereby to distribute the mass substantially equally with respect to the axis of rotation; a conduit connecting the pump to said valve; and an outlet conduit from the pump adapted to be connected to a measuring instrument.

11. In a pneumatic speedometer of the character described, a stationary casing; a pump having a housing rotatably mounted in the casing; opposed cylinders in the pump housing having coaxial bores and one of said cylinders being shorter than the other; a pair of integrally connected pistons in said cylinders; a centrifugal governing valve on the short cylinder communicating with the pump; and an outlet conduit from the pump adapted to be connected to a measuring instrument.

12. In a pneumatic speedometer of the character described, a rotatable pump housing having a reciprocating piston therein; a ported cylinder connected to one side of the pump housing and having a centrifugally operated piston valve therein; a compression spring acting against the inner end of the piston and serving normally to maintain the piston at the outer limit of its stroke during the start period and to assist in damping the inward movement of the piston; a stop member on the piston adapted to limit the outward movement thereof; an air conduit connecting the pump to said ported cylinder; and an outlet conduit for the pump adapted to be connected to a measuring instrument.

WALDEMAR MÖLLER.
HUBERT LORENZ.